(12) United States Patent
Manda et al.

(10) Patent No.: US 7,653,460 B2
(45) Date of Patent: Jan. 26, 2010

(54) THERMAL MANAGEMENT OF EXTRUDER OF MOLDING SYSTEM, AMONGST OTHER THINGS

(75) Inventors: Jan Marius Manda, Toronto (CA); Robert Domodossola, Brampton (CA)

(73) Assignee: Husky Injection Molding Systems Ltd., Bulton, Ontario (CA)

( * ) Notice: Subject to any disclaimer, the term of this patent is extended or adjusted under 35 U.S.C. 154(b) by 352 days.

(21) Appl. No.: 11/503,683

(22) Filed: Aug. 14, 2006

(65) Prior Publication Data

US 2008/0039970 A1 Feb. 14, 2008

(51) Int. Cl.
G05D 23/00 (2006.01)
B28B 17/00 (2006.01)
B28B 13/00 (2006.01)
D01D 5/24 (2006.01)

(52) U.S. Cl. ............... 700/299; 700/300; 425/135; 425/143; 264/209.7

(58) Field of Classification Search .......... 700/197, 700/20, 204–205, 299–300; 425/135, 143; 264/209.7

See application file for complete search history.

(56) References Cited

U.S. PATENT DOCUMENTS

| | | | |
|---|---|---|---|
| 3,735,805 A | | 5/1973 | Stillhard |
| 3,822,867 A | * | 7/1974 | Evans .................. 366/79 |
| 4,146,601 A | * | 3/1979 | Bishop ................ 264/40.1 |
| 4,197,070 A | * | 4/1980 | Koschmann .......... 425/135 |
| 4,213,747 A | * | 7/1980 | Friedrich ............. 425/144 |
| 4,272,466 A | | 6/1981 | Harris |
| 4,309,114 A | | 1/1982 | Klein et al. |
| 4,430,698 A | * | 2/1984 | Harris .................. 700/42 |
| 4,545,504 A | * | 10/1985 | Fabel et al. ........... 222/55 |
| 4,667,852 A | | 5/1987 | Siemann |
| 4,721,589 A | * | 1/1988 | Harris ................. 264/40.1 |
| 4,882,105 A | * | 11/1989 | Volk, Jr. .............. 264/40.1 |
| 5,028,376 A | * | 7/1991 | Vanderwoude ........ 264/566 |
| 5,062,053 A | * | 10/1991 | Shirai et al. .......... 700/200 |
| 5,149,193 A | * | 9/1992 | Faillace ............... 366/145 |
| 5,272,644 A | * | 12/1993 | Katsumata et al. .... 700/207 |
| 5,356,575 A | * | 10/1994 | Krosse et al. ......... 264/40.1 |
| 5,411,686 A | * | 5/1995 | Hata .................. 264/40.6 |
| 5,419,858 A | * | 5/1995 | Hata et al. ........... 264/40.5 |
| 5,456,870 A | * | 10/1995 | Bulgrin ............... 264/40.6 |

(Continued)

FOREIGN PATENT DOCUMENTS

EP 0727297 A1 8/1996

(Continued)

OTHER PUBLICATIONS

Tralsation of JP409155525A; 1 page; Jun. 17, 1997.*

*Primary Examiner*—Ronald D Hartman, Jr.
(74) *Attorney, Agent, or Firm*—Husky Intellectual Property Services

(57) ABSTRACT

Disclosed is a method of a molding system, the method comprising: determining whether a change in a thermal condition of an extruder is required based on a thermal condition of a zone of a melt passageway of the molding system, wherein setting of a threshold temperature of an extruder heater is adjusted based on a non-extruder sensor positioned away from the extruder but positioned proximate to the melt passageway, the melt passageway is also positioned external of the extruder, so that the non-extruder sensor is not negatively influenced by heat retained in the extruder.

12 Claims, 2 Drawing Sheets

U.S. PATENT DOCUMENTS

| | | | |
|---|---|---|---|
| 5,597,588 A | 1/1997 | Totani et al. | |
| 6,104,006 A | 8/2000 | Kimura et al. | |
| 6,618,041 B2 * | 9/2003 | Nishizawa | 345/173 |
| 6,649,095 B2 * | 11/2003 | Buja | 264/40.6 |
| 6,755,564 B2 | 6/2004 | Eiva | |
| 6,852,257 B2 | 2/2005 | Eiva | |
| 7,249,940 B2 * | 7/2007 | Senda et al. | 425/143 |
| 2001/0016566 A1 * | 8/2001 | Allan et al. | 510/447 |
| 2001/0023997 A1 * | 9/2001 | Iimura et al. | 264/40.1 |
| 2002/0084543 A1 * | 7/2002 | Buja | 264/40.4 |
| 2003/0080452 A1 * | 5/2003 | Bulgrin et al. | 264/40.1 |
| 2004/0111116 A1 * | 6/2004 | Kennedy et al. | 606/228 |
| 2004/0232813 A1 * | 11/2004 | Nakano et al. | 313/112 |
| 2006/0138690 A1 * | 6/2006 | Schwaiger et al. | 264/40.6 |
| 2006/0261509 A1 * | 11/2006 | Lustiger et al. | 264/143 |

FOREIGN PATENT DOCUMENTS

| | | | |
|---|---|---|---|
| EP | 0491160 B1 | | 1/1997 |
| JP | 409155525 A | * | 6/1997 |
| JP | 2005138448 A | | 6/2005 |

* cited by examiner

THERMAL MANAGEMENT OF EXTRUDER OF MOLDING SYSTEM, AMONGST OTHER THINGS

TECHNICAL FIELD

The present invention generally relates to, but is not limited to, molding systems, and more specifically the present invention relates to, but is not limited to, (i) a method of a molding system, (ii) a controller of a molding system, (iii) an article of manufacture of a controller of a metal molding system, (iv) a network-transmittable signal of a controller of a molding system and/or (v) a molding system, amongst other things.

BACKGROUND

Examples of known molding systems are (amongst others): (i) the HyPET™ Molding System, (ii) the Quadloc™ Molding System, (iii) the Hylectric™ Molding System, and (iv) the HyMet™ Molding System, all manufactured by Husky Injection Molding Systems Limited (Location: Bolton, Ontario, Canada; www.husky.ca).

U.S. Pat. No. 4,272,466 (Inventor: Harris; Published: Jun. 9, 1981) discloses a system and method of temperature control for a plastics extruder uses a deep well sensor and a shallow well sensor in each temperature control zone along an extruder barrel. The temperature indications of these sensors are not combined. The shallow sensor detects temperature near the barrel surface. An associated controller compares the sensor temperature with a manually preset temperature set point. The differences between the detected and set temperature are used by the controller to effect heating or cooling of its associated temperature control zone. Each deep sensor is located proximate the bore in which the plastic is moved. The deep sensor temperature indication is compared with the set point of a second controller. Variations of the deep temperature from the set point generate an error signal that is applied to the first, shallow well temperature controller to vary its set point. A melt temperature control addition can be made by adding a melt temperature sensor directly in the path of melt between the extruder screw and the extrusion die. A further controller compares its set point with that of the melt temperature and modifies the deep temperature controller set points of the several zones along the extruder barrel to correct the melt temperature.

U.S. Pat. No. 4,309,114 (Inventor: Klein et al; Published: 1982 Jan. 5) discloses an apparatus and a method in which temperature of a barrel inner surface and temperature of a screw conveyor outer surface of a plasticating extruder are varied, alternately, in repeated steps, independent of one another along at least a portion of the solids conveying zone of the extruder, while a production effectiveness parameter simultaneously is monitored, until the monitored production effectiveness parameter is optimized and the production effectiveness of the extruder is at a desired maximum.

U.S. Pat. No. 5,149,193 (Inventor: Faillace; Published: Sep. 22, 1992) discloses an extruder temperature controller for an extruder barrel and a method for controlling the temperature of an extruder barrel. The controller includes a device for determining an actual screw speed and for storing a plurality of screw speeds. Each member of the plurality of stored screw speeds has a corresponding stored temperature reset value. The extruder temperature controller has a device for comparing and selecting that compares the actual screw speed to each of the plurality of stored screw speeds and selects a default screw speed. The default screw speed has a smaller deviation from the actual screw speed than any other member of the compared, stored screw speeds. The controller further includes a device for generating a control output driver signal to a heat exchanger. The control output driver signal is the corresponding stored temperature reset value for the default screw speed. The adaptive reset value for a specific speed is derived for each extruder barrel zone for each profile table section of setpoints and parameters for a particular extrusion material and particular process.

U.S. Pat. No. 5,272,644 (Inventor: Katsumata et al; Published: Dec. 21, 1993) discloses an apparatus for controlling a heating temperature, especially for heating a resin in an injection mold machine, an extruder and the like. The apparatus includes (i) a control device for controlling a heating means and the state of a heated barrel and (ii) a condition compensating device for issuing a compensation input to the heaters respectively in response to a reset of the control device, depending on the kinds of resin materials and molding conditions so as to prevent insufficient moldability in the injection mold machine and a deterioration of resin.

U.S. Pat. No. 5,597,588 (Inventor: Totani et al; Published: Jan. 28, 1997) discloses a barrel temperature control apparatus for an injection molding machine that can execute the barrel temperature control in such a way as to optimize the disturbance suppression characteristics. The temperature control section includes the manipulated variable addition and subtraction section at the rear stage of the PID control section in such a way that the barrel temperature of the injection molding machine can be controlled under both feedback and feed-forward. Further, when the same products are molded continuously, the barrel temperature is feed-forward controlled on the basis of the learned change manipulated variable.

U.S. Pat. No. 6,104,006 (Inventor: Shigeru et al; Published: Aug. 15, 2000) discloses a method and an apparatus for the programmed temperature control of a heating barrel provides for programmed temperature control in which a thermal sensor can be set selectively in either or any of plural sensor holes on the feeding zone of the heating barrel. By sensing the temperature at the most appropriate position with in the feeding zone, the molding injection is adapted to various resins with different properties, preventing clogging of resin in the heating barrel and changed color of molded articles.

U.S. Pat. No. 6,755,564 (Inventor: Eiva; Published: Jun. 29, 2004) discloses an extruder temperature controller for an extruder barrel. The extruder temperature controller includes means for determining an actual screw speed and has means for storing a plurality of screw speeds. Each member of the plurality of stored screw speeds has a corresponding stored temperature reset value. The extruder temperature controller has a means for comparing and selecting that compares the actual screw speed to each of the plurality of stored screw speeds and selects a default screw speed. The default screw speed has a smaller deviation from the actual screw speed than any other member of the compared, stored screw speeds. The controller further includes a means for generating a control output driver signal to the heat exchange means. The control output driver signal is the corresponding stored temperature reset value for the default screw speed. The invention further includes a means for delaying a control alarm for a predetermined time when the means for generating a control output driver signal to the heat exchange means operates at or near maximum capacity. The invention includes a method for controlling the temperature of an extruder barrel.

U.S. Pat. No. 6,852,257 (Inventor: Eiva; Published: Feb. 8, 2005) discloses a method for operating an extruder temperature controller. The method can include sensing an actual screw speed for an extruder screw in an extruder barrel. The extruder barrel has at least one heat exchange means. The method can then involve indexing and storing a plurality of screw speeds. Each of the stored screw speeds corresponds to a temperature reset value. Comparing the actual screw speed with each of the stored screw speeds can then be performed. Selecting one of the stored screw speeds can then occur. The selected screw speed is a member of the plurality of stored screw speeds having a value most arithmetically equivalent to the actual screw speed. The step of selecting retrieves the temperature reset value corresponding to the selected, stored screw speed. Generating a control output driver signal to the heat exchange means can occur. The control output driver signal is responsive to the retrieved temperature reset value. The invention includes delaying a control alarm for a predetermined time when generating a control output driver signal to the heat exchange means is at or near maximum capacity.

SUMMARY

According to a first aspect of the present invention, there is provided a method of a molding system, the method including determining whether a change in a thermal condition of an extruder is required based on a thermal condition of a zone of a melt passageway of the molding system.

According to a second aspect of the present invention, there is provided a controller of a molding system, the controller having a controller-usable medium embodying instructions being executable by the controller, the controller operatively couplable to the molding system, the instructions including executable instructions for directing the controller to determine whether a change in a thermal condition of an extruder is required based on a thermal condition of a zone of a melt passageway of the molding system.

According to a third aspect of the present invention, there is provided an article of manufacture of a controller of a metal molding system, the article of manufacture, including a controller-usable medium embodying instructions executable by the controller, the controller operatively couplable to the molding system, the instructions, having executable instructions for directing the controller to determine whether a change in a thermal condition of an extruder is required based on a thermal condition of a zone of a melt passageway of the molding system.

According to a fourth aspect of the present invention, there is provided a network-transmittable signal of a controller of a molding system, having a carrier signal modulatable to carry instructions executable by a controller operatively couplable to a molding system, the instructions including executable instructions for directing the controller to determine whether a change in a thermal condition of an extruder is required based on a thermal condition of a zone of a melt passageway of the molding system.

Technical effect, amongst other technical effects, of the aspects of the present invention is improved temperature maintenance of a metallic molding material disposed in the melt passageway while the metallic molding material is waiting to be injected from the melt passageway into a mold cavity of a mold. If the metallic molding material is not kept at maintenance temperature, the metallic molding material may have undesirable characteristics after becoming solidified in the mold cavity of the mold.

BRIEF DESCRIPTION OF THE DRAWINGS

A better understanding of the exemplary embodiments of the present invention (including alternatives and/or variations thereof) may be obtained with reference to the detailed description of the exemplary embodiments of the present invention along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 1:
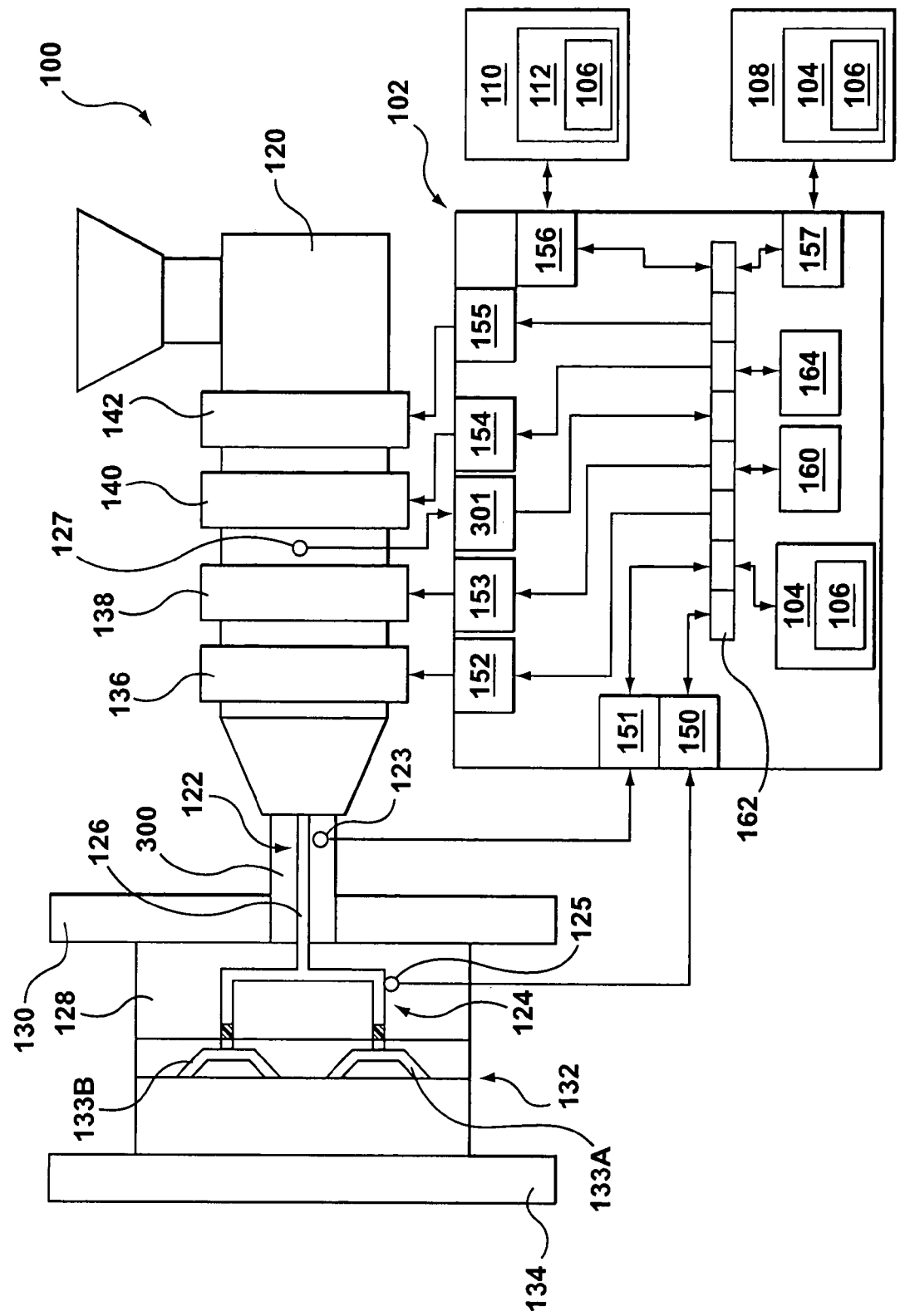
FIG. 1 is a schematic representation of a molding system (100) according to a first exemplary embodiment (which is the preferred embodiment)

FIG. 1 is a schematic representation of a molding system 100 (hereafter referred to as the "system 100") according to the first exemplary embodiment. The system 100 is operatively couplable to a controller 102. The controller 102 is used to control the system 100 (or to direct the system 100) according to a method that includes determining whether a change in a thermal condition of an extruder 120 is required based on a thermal condition of zones 122, 124 of a melt passageway 126 of the system 100. The extruder 120 may include an injection unit and barrel. The thermal condition of the zones 122, 124 (any one zone or both) may be measured by way of thermal sensors 123, 125 respectively, or equivalent, (that are operatively coupled to the controller 102) that are placed proximate of the zones 122, 124. The melt passageway 126 is formed by any one of: (i) a machine nozzle, (ii) a sprue, (iii) a manifold of a hot runner and (iv) any combination and permutation thereof.

The system 100 includes a machine nozzle 300 that connects the extruder 120 to a hot runner 128. The hot runner 128 is attached to a stationary platen 130. The machine nozzle 300 passes through the stationary platen 130. A mold 132 includes (i) a stationary mold portion that is attached to the hot runner 128 and (ii) a movable mold portion that is attached to a movable platen 134. The mold 132 defines mold cavities 133A, 133B. Tie bars and clamping mechanisms are also used but they are not depicted since theses items are well known to persons skilled in the art. Extruder heaters 136, 138, 140, 142 are coupled to the extruder 120. Preferably, the extruder 120 includes a reciprocating screw (not depicted) that is used to convert chips (or larger portions) of magnesium (or other types of metal, such as aluminum, zinc, etc). The extruder heaters 136, 138, 140, 142 are used to keep the molten metallic molding material hot before it is injected into the mold cavities 133A, 133B defined by the mold 132. The melt passageway 126 extends from the extruder 120 through the machine nozzle 300 through the hot runner 128 and up to the gates (the entrances of the cavities 133A, 133B). The controller 102 is used to control or change the thermal condition of an extruder 120 by controlling the extruder heaters 136, 138, 140, 142 (that is, turning the extruder heaters 136 to 142 on or off in combination or individually).

The controller 102 is programmable and includes a controller-usable medium 104 (such as a hard disk, floppy disk, compact disk, optical disk, flash memory, random-access memory, etc) that embodies programmed instructions 106 (hereafter referred to as the "instructions 106") that are executable by the controller 102. The instructions 106 include executable instructions for directing the controller 102 to determine whether a change in a thermal condition of the extruder 120 is required based on a thermal condition of the zone 122, 124 of a melt passageway 126. Additional details of the controller 100 are described below.

The instructions 106 may be delivered to the controller 102 via several approaches. An article of manufacture 108 may be used to deliver the instructions 106 to the controller 102. The article of manufacture 108 includes a controller-usable medium 104 (such as a hard disk, floppy disk, compact disk, optical disk, flash memory, etc) that is enclosed in a housing unit. The controller-usable medium 104 embodies the instructions 106. The article of manufacture 108 is interfacable with the controller 102 (such as via a floppy disk drive reader, etc). A network-transmittable signal 110 may also be used (separately or in conjunction with the article of manufacture 108) to deliver the instructions 106 to the controller 102. The network-transmittable signal 110 includes a carrier signal 112 modulatable to carry the instructions 106. The network-transmittable signal 110 is transmitted via a network (such as the Internet) and the network is interfacable with the controller 102 (such as via a modem, etc). The instructions 106 that are to be executed by the controller 102 also include executable instructions for directing the controller 102 to: (i) determine a change in a thermal condition of the zones 122, 124 (any one zone or both) of the melt passageway 126, (ii) determine whether a change in the thermal condition of the extruder 120 is required based on a comparison between the thermal condition of the zones 122, 124 (any one zone or both) and a threshold, (iii) annunciate a required change in the thermal condition of the extruder (120) based on the change in the thermal status of the zones 122, 124 (any one zone or both), (iv) control the thermal condition of the extruder 120 based on the change in the thermal status of the zones 122, 124 (any one zone or both), (v) determine whether a change in the thermal condition of the zones 122, 124 (any one zone or both) is a change in a duty cycle of a zone heater positioned proximate of the zones 122, 124 (any one zone or both), (v) determine whether a change in the thermal condition of the zones 122, 124 (any one zone or both) is a change in temperature of the zones 122, 124 (any one zone or both).

The controller 102 includes interface modules 150 to 157 (all known to persons skilled in the art) inclusive that are used to interface the controller 102 to the thermal sensor 125, the thermal sensor 123, the extruder heaters 136 to 142 inclusive, the network-transmittable signal 110 and the article of manufacture 108 respectively. The interface modules 150, 151 and 301 are temperature-sensor interface modules. The interface modules 152 to 155 are heater-interface modules. The interface module 156 is a modem. The interface module 157 is a controller-usable medium reader (such as a floppy disk, etc).

The controller 102 also includes a CPU (Central Processing Unit) 160 that is used to execute the instructions 106. A bus 162 is used to interface the interface modules 150 to 157, the CPU 160 and the controller-usable medium 104. The controller-usable medium 104 also includes an operating system (such as the Linux operating system) that is used to coordinate automated processing functions related to maintaining the controller 102 in operational condition. A database 164 is coupled to the bus 162 so that the CPU 160 may keep data records pertaining to the operational parameters of the system 100.

Figure 2:
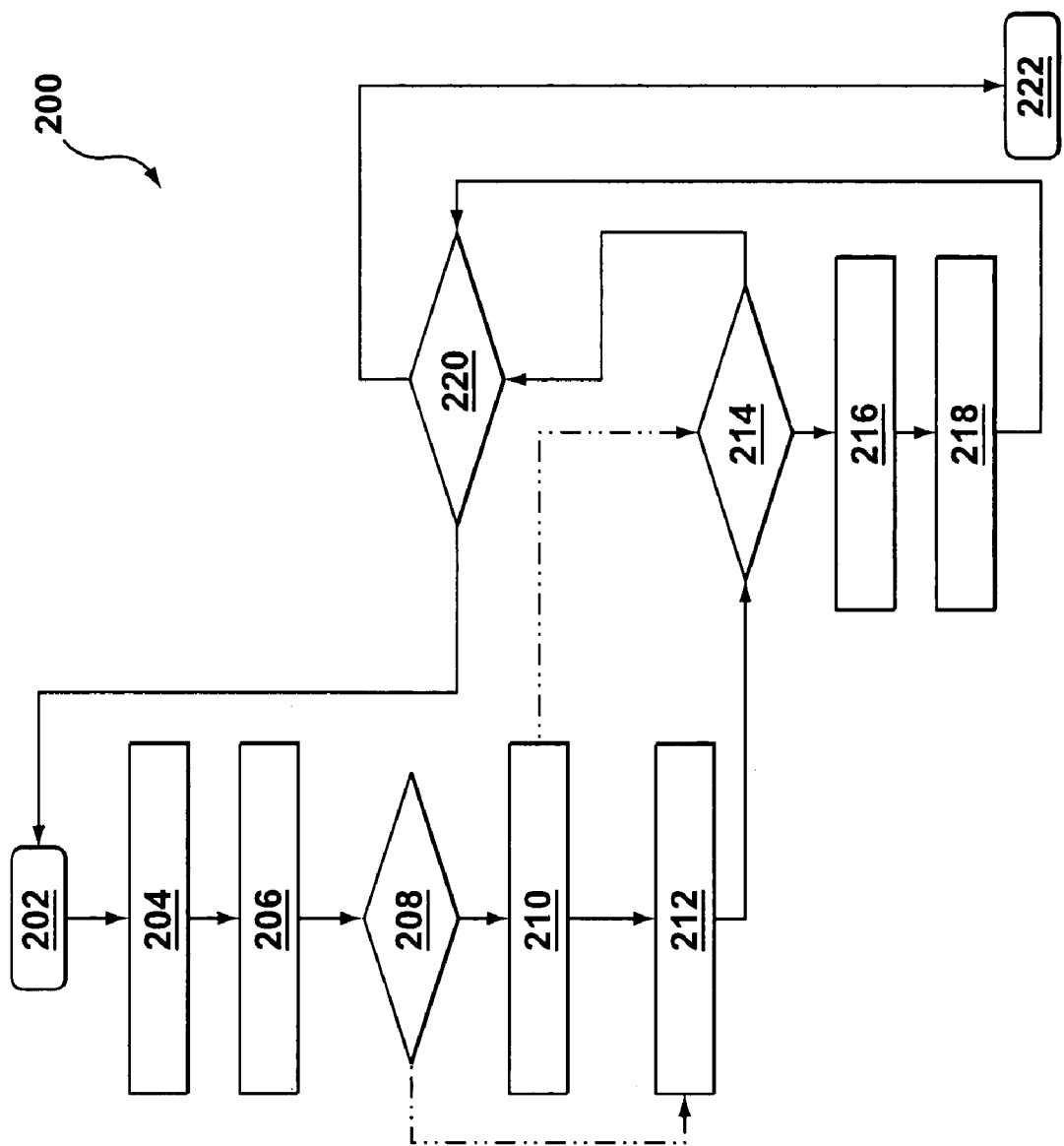
FIG. 2 is a schematic representation of operation of the molding system (100) of FIG. 1.

FIG. 2 is a schematic representation of an operation 200 of the system 100 of FIG. 1. The operation 200 is coded in programmed statements of the instructions 106 by using a programming language (such as C++, Java or assembler language, etc). The instructions 106 are executable by the controller 102 of FIG. 1. Operation 202 includes starting of operation 200 and then control of operation 200 is transferred to operation 204.

Operation 204 includes directing the controller 102 to determine a thermal condition (such as a change in a duty cycle and/or a change in temperature) of the zones 122, 124 (both or one). Preferably the zone is a maintenance zone of the melt passageway 126. Once the determination of the thermal condition has been made by the controller 102, control of operation 200 is then transferred to operation 206.

Operation 206 includes directing the controller 102 to determine whether a change in the thermal condition of the extruder 120 is required based on (i) the determined thermal condition of the zones 122, 124 (one of the zones or both) and/or more specifically and preferably (ii) a comparison between the determined thermal condition of the zone 122, 124 (both zones or one) and a threshold. Once the determination of whether to change the thermal condition of the extruder 120 is made by the controller 102, control of operation 200 is then transferred to operation 208.

Operation 208 includes determining whether to control (adjust the heaters 136 to 142 either individually or in unison or in combination) or to annunciate (to a human operator) or both control and annunciate: (i) if it is required to only annunciate, operational control of operation 200 is transferred to operation 210, (ii) if it is required to only control, operational control of operation 200 is transferred to operation 212 and (iii) if it is required to control and to annunciate, operational control of operation 200 is transferred to operation 212 and then to operation 210 respectively. Control of operation 208 is then transferred, preferably, to operation 210 (or optionally transferred to operation 212).

Operation 210 includes directing the controller 102 to annunciate the required change in the thermal condition of the extruder 120, such as to annunciate the message: (i) "the extruder 120 is too cold" and the message may be used to prompt the operator to manually control the heaters 136 to 142 so as to add heat to the extruder 120, (ii) "the extruder 120 is too hot" and the message may be used to prompt the operator to not add heat to the extruder 120 (or shut off the heaters 136 to 142), and (iii) "the temperature of the extruder 120 is just right" and the message may be used to prompt the operator to not make any changes the heating of the extruder 120. The temperature profile of the extruder 120 may be adjusted by individually adjusting each heater 136 to 142. Control of operation 210 is then transferred, preferably, to operation 212 (or optionally transferred to operation 214).

Operation 212 includes directing the controller 102 to control the thermal condition of the extruder 120 by automatically adjusting (that is, without the aid of the operator) one or more extruder heaters 136 to 142 based on the determined thermal status of the zones 122, 124 (either both zones or one zone). Operational control is then passed over to operation 214.

Operation 214 includes directing the controller 102 to permit a condition, in which the operator may decide to (i) update the database 164, (ii) no updating of the database 164 occurs. If condition (i) is selected (either performed automatically on a timed basis or performed responsive to an input from the operator), operational control is passed over to operation 216. If condition (iii) is selected, operational control is passed over to operation 220.

Operation 216 includes directing the controller 102 to determine a new threshold based on contents of the database 164. The database 164 is indicative of a temperature profile of the extruder 120 corresponding to types of molding material. Operational control is then passed over to operation 218, which includes directing the controller 102 to determine a new threshold based on contents of the database 164.

Operation 220 includes determining whether to end operation 220 or pass on operational control to operation 202.

A technical effect of the aspects of the embodiment is that the melt (a metallic molding material) is kept at a maintenance temperature while the melt is in the melt passageway and waiting to be injected into the mold 132.

According to a variant, the system 100 is a metal-molding system and the molding material includes a metal-based molding material, such as a metal alloy, a magnesium alloy, etc. According to another variant, the system 100, a hot runner is not included and the machine nozzle 300 is coupled to the mold 132.

The system 100 operates in several states, two of which are: (i) an idle state in which molding material is not made to flow from the extruder 120 to the mold 132 and (ii) a running state in which the molding material is made to flow from the extruder 120 to the mold 132 in a cyclical, repeatable manner.

If the system 100 is made to operate in the idle state, an operator of the system 100 sets the threshold (of the extruder heaters 136 to 142) to 1,100 degrees F.; then the temperature of the metal-based molding material (hereafter referred to as the "magnesium alloy") located in the extruder 120 becomes, eventually, approximately 1,100 degrees Fahrenheit (F). The controller 102 reads the output of an extruder temperature sensor 127 (the sensor 127 is connected to the extruder 120); then, the controller 102 responds, according to a closed-loop feedback schema, to the measured temperature of the sensor 127 and to a threshold set for the extruder heaters 136 to 142 by iteratively directing or controlling the extruder heaters 136 to 142 to adjust (increase) their thermal output until the extruder temperature sensor 127 detects 1100 degrees F.; then the controller 102 directs the extruder heaters 136 to 142 to maintain their output of heat energy according to the threshold set by the operator. As a result, the amount of heat generated by the extruder heaters 136 to 142 will (i) only compensate for heat lost to surroundings of the extruder 120 and (ii) maintain the temperature of the molten molding material located in the extruder 120 to the required 1,100 degrees F. The required power to generate this heat may be recorded for further use or reference.

If the system 100 operates in the running state, the measured temperature of the extruder 120 (as measured by sensor 127) may continue to remain at 1,100 degrees F.; however, the actual temperature of the molten magnesium alloy, located in the extruder 120, may likely be lower (for example, 1000 degrees F.) because the molten magnesium alloy dwells in the extruder 120 for a lower duration of time in sharp contrast to the dwell time of the molten magnesium alloy in the extruder 120 during the time that the system 100 operates in the idle state.

The extruder temperature sensor 127 (i) continues to sense the temperature of the barrel of the extruder 120 and (ii) does not necessarily measure the temperature of the molding material in the extruder 120; since the barrel of the extruder 120 contains a large mass of steel, the barrel tends to retain heat and as a result the large mass of the barrel may mask or obscure temperature fluctuations associated with the molten magnesium alloy located in the barrel during time the system 100 operates in the running state. The heat contained in the barrel may be so large that the sensor 127 does not necessarily measure the change in temperature of the molten molding material contained in the barrel of the extruder 120. Therefore, the controller 102 is operating to control the extruder heaters 136 to 142 based on the extruder temperature sensor 127 (which senses primarily barrel temperature and not the change in temperature of the molding material). The extruder temperature sensor 127 is being negatively influenced by heat contained in the barrel of the extruder 120.

So, setting of the threshold temperature of the extruder heaters 136 to 142 (which is stored in the memory of the controller 102) has to be increased to compensate for this effect on the sensor 127. Preferably, the threshold of the extruder heaters 136 to 142 is adjusted (increased or decreased) based on a non-extruder sensor (such as sensors 123, 125) that is positioned away from the extruder 120 but positioned proximate to the melt passageway 126 (passageway 126 is also positioned external of the extruder 120). The non-extruder sensor 123 or 125 is positioned closer to the molding material so that the non-extruder sensor 123 or 125 is not negatively influenced by heat retained and/or moving through in the extruder 120 (in sharp contrast the sensor 127 that is negatively influenced). Now the non-extruder sensor 123 or 125 has a better chance to detect the "true" temperature of the molten magnesium alloy (that is, detection of the "true" temperature being not literally the true temperature but an improved temperature reading). The controller 102 uses the non-extruder sensor 123 or 125 (or both) in its closed loop feedback control schema to adjust either the extruder heaters 136 to 142 (or better yet to adjust the threshold temperature associated with the extruder heaters 136 to 142) so as to, in effect, reset or set a new threshold of the extruder heaters 136 to 142. The foregoing is one approach for detecting whether there is sufficient heating of the molding material disposed in the extruder 120 that is provided by the extruder heaters 136 to 142 (in any combination or permutation thereof).

A second way of compensating or managing thermal output of the extruder heaters 136 to 142 is to infer the temperature of the molten magnesium alloy that is positioned in the extruder 120. Inference of the temperature of the molding material (molten magnesium alloy) positioned in the extruder 120 is based on a relationship between (i) heat output of the extruder heaters 136, 138, 140, 142 and (ii) a sensed temperature of an extruder temperature sensor 127. Initially, the mathematical relationship of the heat output of the extruder heaters 136 to 142 is established or determined. The heat output of the heaters 136 to 142 is proportional to the sum of (i) a sensed temperature of the extruder temperature sensor 127 minus (ii) the temperature of the molten magnesium alloy (which is the valve to be determined). The sensor 127 is connected to an interface module 301, which is in turn connected to the bus 162.

Thermal output of the heaters 136 to 142 equals (i) the heat loss from the extruder 120 to the surroundings of the extruder 120 (this heat loss never arrives to the molten magnesium alloy located in the extruder 120) plus (ii) the heat that reaches the molten magnesium alloy located in the extruder 120. For example, the heat loss may be measured or determined for the condition at the idle state (for example, this amount is determined to be approx 10% of the maximum heat that can be generated by the heaters). The algorithm according to the second method includes the following steps: (i) measure heat output of the extruder heater, (ii) estimate the heat required to process a given amount of molten molding material, (iii) subtract for heat losses from the measured heat output of the extruder heater on order to derive the amount of heat reaching the molding material, (iv) derive the temperature of the molding material using (a) the resultant amount of heat reaching the molding material and (b) the temperature indicated by the extruder temperature sensor 127, and (v) compare the derived temperature of the molding material versus a threshold, and adjust the extruder heater using a closed loop feedback algorithm.

The role of the barrel of the extruder 120 is to: (i) maintain the temperature of the molten molding material during the idle state (after the system 100 has reached a steady state of operation and less heat needs to flow to the molten molding material) or (ii) heat-up the molten molding material from room temperature to a processing temperature during the running state, and the amount of heat that needs to flow through the barrel wall is (a) proportional to the amount of magnesium to be processed and (b) dependant on the shot volume and the cycle time of the system 100.

The preferred zone of the barrel to be used, for the feedback on the actual temperature of the molten molding material, is a zone located downstream that is used to maintain the temperature of the molten molding material that already has reached the desired temperature. The set-point of this zone of the barrel may be set for the desired melt temperature if: (i) the molten molding material arriving to this zone, after a shot has been injected into the mold 132, does not change the measured temperature, there is no need for an adjustment of the extruder heater, (ii) the molten molding material arriving to this zone, after the shot has been injected into the mold 132, increases the temperature sensed by the sensor 127, the molten molding material that arrived is too hot, there is no need for an adjustment of the extruder heater 136 to 142, or (iii) the molten molding material arriving to this zone, after the shot has been injected into the mold 132, decreased the temperature sensed, the molten molding material that arrived is too cold, there is a need for an adjustment of the extruder heater 136 to 142 (any one or combination thereof).

Preferably, a maintenance zone of the barrel of the extruder 120 only has to compensate for the heat loss to the surrounding area of the extruder 120, which is the case when the temperature reading does not change after the shot has been injected into the mold 132, and in this case, the temperature readings may be used for fine adjustment of the temperature of the extruder heaters 136 to 142 before the next shot is injected into the mold.

The description of the exemplary embodiments provides examples of the present invention, and these examples do not limit the scope of the present invention. It is understood that the scope of the present invention is limited by the claims. The exemplary embodiments described above may be adapted for specific conditions and/or functions, and may be further extended to a variety of other applications that are within the scope of the present invention. Having thus described the exemplary embodiments, it will be apparent that modifications and enhancements are possible without departing from the concepts as described. It is to be understood that the exemplary embodiments illustrate the aspects of the invention. Reference herein to details of the illustrated embodiments is not intended to limit the scope of the claims. The claims themselves recite those features regarded as essential to the present invention. Preferable embodiments of the present invention are subject of the dependent claims. Therefore, what is to be protected by way of letters patent are limited only by the scope of the following claims:

What is claimed is:

1. A controller of a molding system, the molding system having: (a) an extruder, (b) extruder heaters being coupled to the extruder, (c) a hot runner forming a melt passageway, the hot runner having: (i) a zone, the melt passageway passing through the zone, and (ii) a thermal sensor being placed proximate of the zone, (d) a machine nozzle connecting the extruder to the hot runner, the controller for being operatively coupled to the thermal sensor, the controller comprising:

a controller-usable medium embodying instructions being executable by the controller, the controller operatively couplable to the molding system, the instructions including:
   executable instructions being configured to direct the controller to control a thermal condition of the extruder by controlling the extruder heaters;
   executable instructions being configured to direct the controller to determine whether a change in the thermal condition of the extruder is required based on a thermal condition of the zone of the hot runner, the thermal condition of the zone being measured by way of the thermal sensor;
   executable instructions being configured to direct the controller to adjust the threshold of the extruder heaters based on a non-extruder sensor that is positioned away from the extruder but positioned proximate to the melt passageway, and the melt passageway is also positioned external of the extruder, the non-extruder sensor is positioned closer to the molding material so that the non-extruder sensor is not negatively influenced by heat of the extruder, and the non-extruder sensor detects the temperature reading of the molten magnesium alloy; and
   executable instructions being configured to direct the controller to use the non-extruder sensor in a closed loop feedback control schema to adjust the heat of the extruder.

2. The controller of claim 1, further comprising:
executable instructions being configured to direct the controller to determine whether the change in the thermal condition of the extruder is required based on a comparison between the thermal condition of the zone and a threshold.

3. The controller of claim 1, further comprising:
executable instructions being configured to direct the controller to annunciate a required change in the thermal condition of the extruder based on the change in thermal status of the zone.

4. The controller of claim 1, further comprising:
executable instructions being configured to direct the controller to determine whether the change in the thermal condition of the zone is the change in temperature of the zone.

5. An article of manufacture of a controller of a molding system the molding system having: (a) an extruder, (b) extruder heaters being coupled to the extruder, (c) a hot runner forming a melt passageway, the hot runner having: (i) a zone, the melt passageway passing through the zone, and (ii) a thermal sensor being placed proximate of the zone, (d) a machine nozzle connecting the extruder to the hot runner, the controller for being operatively coupled to the thermal sensor, the article of manufacture, comprising:

a controller-usable medium embodying instructions executable by the controller, the controller operatively couplable to the molding system, the instructions, including:
   executable instructions being configured to direct the controller to control a thermal condition of the extruder by controlling the extruder heaters;
   executable instructions being configured to direct the controller to determine whether a change in the thermal condition of the extruder is required based on a thermal condition of the zone of the hot runner, the thermal condition of the zone being measured by way of the thermal sensor;

executable instructions being configured to direct the controller to adjust the threshold of the extruder heaters based on a non-extruder sensor that is positioned away from the extruder but positioned proximate to the melt passageway, and the melt passageway is also positioned external of the extruder, the non-extruder sensor is positioned closer to the molding material so that the non-extruder sensor is not negatively influenced by heat of the extruder, and the non-extruder sensor detects the temperature reading of the molten magnesium alloy; and executable instructions being configured to direct the controller to use the non-extruder sensor in a closed loop feedback control schema to adjust the heat of the extruder.

6. The article of manufacture of claim 5, further comprising:

executable instructions being configured to direct the controller to determine whether the change in the thermal condition of the extruder is required based on a comparison between the thermal condition of the zone and a threshold.

7. The article of manufacture of claim 5, further comprising:

executable instructions being configured to direct the controller to annunciate a required change in the thermal condition of the extruder based on the change in a thermal status of the zone.

8. The article of manufacture of claim 5, further comprising:

executable instructions being configured to direct the controller to determine whether the change in the thermal condition of the zone is the change in temperature of the zone.

9. A molding system, comprising:

an extruder;

extruder heaters being coupled to the extruder;

a hot runner forming a melt passageway, the hot runner having: (i) a zone, the melt passageway passing through the zone, and (ii) a thermal sensor being placed proximate of the zone;

a machine nozzle connecting the extruder to the hot runner; and a controller being operatively coupled to the thermal sensor, the controller including:

a controller-usable medium embodying instructions being executable by the controller, the controller operatively couplable to the molding system, the instructions, including:

executable instructions being configured to direct the controller to control a thermal condition of the extruder by controlling the extruder heaters;

executable instructions being configured to direct the controller to determine whether a change in the thermal condition of the extruder is required based on a thermal condition of the zone of the hot runner, the thermal condition of the zone being measured by way of the thermal sensor;

executable instructions being configured to direct the controller to adjust the threshold of the extruder heaters based on a non-extruder sensor that is positioned away from the extruder but positioned proximate to the melt passageway, and the melt passageway is also positioned external of the extruder, the non-extruder sensor is positioned closer to the molding material so that the non-extruder sensor is not negatively influenced by heat of the extruder, and the non-extruder sensor detects the temperature reading of the molten magnesium alloy; and executable instructions being configured to direct the controller to use the non-extruder sensor in a closed loop feedback control schema to adjust the heat of the extruder.

10. The molding system of claim 9, further comprising:

executable instructions being configured to direct the controller to determine whether the change in the thermal condition of the extruder is required based on a comparison between the thermal condition of the zone and a threshold.

11. The molding system of claim 9, further comprising:

executable instructions being configured to direct the controller to annunciate a required change in the thermal condition of the extruder based on the change in a thermal status of the zone.

12. The molding system of claim 9, further comprising:

executable instructions being configured to direct the controller to determine whether the change in the thermal condition of the zone is the change in temperature of the zone.

\* \* \* \* \*